United States Patent
Hania et al.

(10) Patent No.: US 12,256,060 B2
(45) Date of Patent: Mar. 18, 2025

(54) SYSTEM AND METHOD FOR VERIFYING A SELECTION OF AN OPTICAL SENSOR

(71) Applicant: RAIL VISION LTD, Ra'anana (IL)

(72) Inventors: Shahar Hania, Kedumim (IL); Sharon Bason, Rosh Haayin (IL)

(73) Assignee: RAIL VISION LTD, Ra'anana (IL)

( * ) Notice: Subject to any disclaimer, the term of this patent is extended or adjusted under 35 U.S.C. 154(b) by 0 days.

(21) Appl. No.: 18/548,124

(22) PCT Filed: Mar. 2, 2022

(86) PCT No.: PCT/IL2022/050229
§ 371 (c)(1),
(2) Date: Aug. 28, 2023

(87) PCT Pub. No.: WO2022/185308
PCT Pub. Date: Sep. 9, 2022

(65) Prior Publication Data
US 2024/0146900 A1 May 2, 2024

Related U.S. Application Data

(60) Provisional application No. 63/156,407, filed on Mar. 4, 2021.

(51) Int. Cl.
*H04N 17/00* (2006.01)
*H04N 23/80* (2023.01)

(52) U.S. Cl.
CPC .......... *H04N 17/002* (2013.01); *H04N 23/80* (2023.01)

(58) Field of Classification Search
CPC ...... H04N 17/002; H04N 23/80; H04N 23/81; H04N 23/90
See application file for complete search history.

(56) References Cited

U.S. PATENT DOCUMENTS

| 4,439,157 A | * | 3/1984 | Breglia | G02B 27/0172 359/618 |
| 6,543,899 B2 | * | 4/2003 | Covannon | G02B 27/017 353/11 |
| 6,652,104 B2 | * | 11/2003 | Nishida | H04N 9/3185 353/69 |

(Continued)

FOREIGN PATENT DOCUMENTS

WO    WO 2008108458    9/2008

*Primary Examiner* — Michael B. Pierorazio
(74) *Attorney, Agent, or Firm* — PEARL COHEN ZEDEK LATZER BARATZ LLP

(57) ABSTRACT

A system for verifying a selection of an optical sensor of two or more optical sensors may include: a first optical sensor; a second optical sensor; and a processing unit configured to: receive a selection of one of the first and second optical sensors to provide a selected optical sensor and a non-selected optical sensor; change parameters of the selected optical sensor to a selected set of parameters; receive image frames from the selected optical sensor; change parameters of the non-selected optical sensor to a predefined set of parameters; receive image frames from the non-selected optical sensor; determine that the selected optical sensor operates according to the selected set of parameters and/or that the non-selected optical sensor operates according to the predefined set of parameters; and verify, based on at least one of the determinations, the selection of the optical sensor.

20 Claims, 4 Drawing Sheets

(56) References Cited

U.S. PATENT DOCUMENTS

| | | | | |
|---|---|---|---|---|
| 6,877,863 B2* | 4/2005 | Wood | | H04N 9/3185 353/42 |
| 7,070,283 B2* | 7/2006 | Akutsu | | H04N 5/74 353/30 |
| 7,119,965 B1* | 10/2006 | Rolland | | G02B 27/0172 359/630 |
| 7,182,466 B2* | 2/2007 | Sunaga | | H04N 5/74 353/69 |
| 7,270,421 B2* | 9/2007 | Shinozaki | | G03B 21/142 353/121 |
| 7,359,575 B2* | 4/2008 | Bassi | | G06T 3/18 345/427 |
| 7,441,906 B1* | 10/2008 | Wang | | G03B 21/14 353/121 |
| 7,782,387 B2* | 8/2010 | Azuma | | H04N 25/68 359/662 |
| 8,676,427 B1* | 3/2014 | Ferguson | | G08G 1/0965 701/23 |
| 9,344,761 B2 | 5/2016 | Funatsu | | H04N 21/4318 |
| 9,753,126 B2* | 9/2017 | Smits | | G01S 17/003 |
| 9,810,913 B2* | 11/2017 | Smits | | G02B 5/124 |
| 10,067,230 B2* | 9/2018 | Smits | | G01S 17/86 |
| 10,261,183 B2* | 4/2019 | Smits | | G01S 7/4868 |
| 10,379,220 B1* | 8/2019 | Smits | | G01S 7/4811 |
| 10,394,112 B2* | 8/2019 | Johnson | | A01M 1/223 |
| 10,473,921 B2* | 11/2019 | Smits | | G01S 17/87 |
| 10,591,605 B2* | 3/2020 | Smits | | G01S 17/42 |
| 10,663,626 B2* | 5/2020 | Benitez | | G02B 27/01 |
| 11,830,455 B2* | 11/2023 | Schriever | | G06F 3/16 |
| 2002/0051095 A1* | 5/2002 | Su | | H04N 9/3194 348/745 |
| 2002/0067466 A1* | 6/2002 | Covannon | | G02B 30/26 353/8 |
| 2002/0122161 A1* | 9/2002 | Nishida | | H04N 9/3194 353/70 |
| 2003/0191836 A1* | 10/2003 | Murtha | | H04L 67/02 709/224 |
| 2003/0210381 A1* | 11/2003 | Itaki | | H04N 5/74 353/70 |
| 2004/0156024 A1* | 8/2004 | Matsuda | | H04N 9/3185 353/70 |
| 2005/0046803 A1* | 3/2005 | Akutsu | | H04N 5/74 353/69 |
| 2005/0073661 A1* | 4/2005 | Tamura | | H04N 9/3194 353/70 |
| 2005/0151934 A1* | 7/2005 | Akutsu | | G03B 21/147 353/69 |
| 2005/0237492 A1* | 10/2005 | Shinozaki | | H04N 9/3185 353/69 |
| 2006/0098167 A1* | 5/2006 | Sato | | G03B 21/26 353/35 |
| 2006/0203207 A1* | 9/2006 | Ikeda | | H04N 9/3185 353/70 |
| 2007/0008344 A1* | 1/2007 | Medina | | G06T 15/10 345/647 |
| 2007/0257941 A1* | 11/2007 | Plut | | G06F 9/451 345/660 |
| 2007/0285626 A1* | 12/2007 | Miyasaka | | G03B 21/206 353/85 |
| 2009/0278999 A1* | 11/2009 | Ofune | | H04N 21/47 348/E3.048 |
| 2010/0002123 A1* | 1/2010 | Nozaki | | H04N 23/00 348/E5.022 |
| 2010/0045942 A1* | 2/2010 | Furui | | H04N 9/3194 353/69 |
| 2010/0321647 A1* | 12/2010 | Schuler | | G06F 1/3265 715/764 |
| 2011/0085044 A1* | 4/2011 | Noda | | G03B 21/58 348/E5.133 |
| 2011/0210979 A1* | 9/2011 | Furui | | G03B 37/04 345/619 |
| 2011/0234994 A1* | 9/2011 | Uchiyama | | H04N 9/3185 353/121 |
| 2011/0285971 A1* | 11/2011 | Oka | | H04N 9/3185 353/70 |
| 2011/0292351 A1* | 12/2011 | Ishii | | H04N 9/3185 353/69 |
| 2013/0245877 A1* | 9/2013 | Ferguson | | G06V 20/56 701/23 |
| 2014/0303827 A1* | 10/2014 | Dolgov | | B60W 30/00 701/23 |
| 2015/0077369 A1* | 3/2015 | Nagahara | | G09G 5/003 345/173 |
| 2015/0094897 A1* | 4/2015 | Cuddihy | | B60K 35/81 701/23 |
| 2015/0336502 A1* | 11/2015 | Hillis | | G05D 1/0088 701/23 |
| 2017/0180659 A1 | 6/2017 | Levoy | | |
| 2017/0240096 A1* | 8/2017 | Ross | | G05D 1/0212 |
| 2018/0158102 A1* | 6/2018 | Choi | | G06Q 30/0251 |
| 2019/0082114 A1 | 3/2019 | Jeon | | |
| 2019/0112791 A1 | 4/2019 | Ariga et al. | | |
| 2019/0228565 A1 | 7/2019 | Yushiya | | |
| 2020/0174130 A1* | 6/2020 | Banerjee | | B60R 11/04 |
| 2020/0413036 A1 | 12/2020 | Hania | | |
| 2021/0004610 A1* | 1/2021 | Huang | | G01S 17/10 |
| 2021/0168440 A1* | 6/2021 | Ho | | H04N 21/43632 |
| 2021/0310823 A1* | 10/2021 | Wilbers | | G01C 21/3811 |
| 2021/0341310 A1* | 11/2021 | Wilbers | | G01C 21/26 |
| 2022/0171412 A1* | 6/2022 | Cui | | G08B 3/10 |
| 2022/0201262 A1* | 6/2022 | Chen | | H04N 9/3185 |
| 2022/0242430 A1* | 8/2022 | Watano | | G06F 3/017 |
| 2023/0010713 A1* | 1/2023 | Park | | G01S 17/88 |

* cited by examiner

SYSTEM AND METHOD FOR VERIFYING A SELECTION OF AN OPTICAL SENSOR

CROSS-REFERENCE TO RELATED APPLICATIONS

This application is a National Phase Application of PCT International Application No. PCT/IL2022/050229, International Filing Date Mar. 2, 2022, claiming the benefit of U.S. Provisional Application No. 63/156,407, filed Mar. 4, 2021, which are hereby incorporated by reference.

FIELD OF THE INVENTION

The present invention relates to the field of optical sensors systems and, more particularly, to systems and methods for verifying a selection of an optical sensor and for built-in-tests thereof.

BACKGROUND OF THE INVENTION

Some optical systems having two or more optical sensors may require a verification module to verify a selection of an optical sensor of the two or more optical sensors.

SUMMARY OF THE INVENTION

Some embodiments of the present invention may provide a system for verifying a selection of an optical sensor of two or more optical sensors, which system may include: a first optical sensor; a second optical sensor; and a processing unit coupled to the first and second optical sensors, the processing unit being configured to: receive a selection of one of the first and second optical sensors to provide a selected optical sensor and a non-selected optical sensor; change parameters of the selected optical sensor to a selected set of parameters; receive image frames from the selected optical sensor; change parameters of the non-selected optical sensor to a predefined set of parameters; receive image frames from the non-selected optical sensor; determine at least one of: that the selected optical sensor operates according to the selected set of parameters, based on at least a portion of the image frames from the selected optical sensor, and that the non-selected optical sensor operates according to the predefined set of parameters, based on at least a portion of the image frames from the non-selected optical sensor; and verify, based on at least one of the determinations, the selection of the optical sensor.

In some embodiments, the processing unit is configured to change the parameters of the non-selected optical sensor to the predefined set of parameters so as to cause the image frames being acquired by the non-selected optical sensor to contain a substantially black image.

In some embodiments, the processing unit is further configured to: calculate an average value of pixels of a subset of the image frames from the non-selected optical sensor; determine that the image frames from the non-selected optical sensor contain the substantially black image and that the non-selected optical sensor operates according to the predefined set of parameters if the calculated average value is below a predefined average threshold value; and verify, based on the determination, the selection of the optical sensor.

In some embodiments, the processing unit is further configured to: determine that the image frames from the non-selected optical sensor contain a non-black image and that the non-selected optical sensor does not operate in accordance with the predefined set of parameters if the calculated average is above the predefined average threshold; and issue a notification, based on the determination, that the selection of the optical sensor cannot be unambiguously verified.

In some embodiments, the processing unit is configured to: calculate an average standard deviation value of pixels of a subset of the image frames from the selected optical sensor; calculate an average standard deviation value of pixels of a subset of the image frames from the non-selected optical sensor; determine that the non-selected optical sensor operates according to the predefined set of parameters if a difference between (i) the average standard deviation value calculated for the image frames from the non-selected optical sensor, and (ii) the average standard deviation value calculated for the image frames from the selected optical sensor is below a predefined first standard deviation threshold; determine that the selected optical sensor operates according to the predefined set of parameters if a difference between (i) the average standard deviation value calculated for the image frames from the selected optical sensor, and (ii) the average standard deviation value calculated for the image frames from the non-selected optical sensor is above a predefined second standard deviation threshold; and verify, based on the determinations, the selection of the optical sensor.

In some embodiments, the processing unit is configured to: determine at least one of: that the non-selected optical sensor does not operate according to the predefined set of parameters if the difference is above the predefined first standard deviation threshold, and determine that the selected optical sensor does not operate according to the selected set of parameters if the difference is below the predefined second standard deviation threshold; and issue, based on at least one of the determinations, a notification that the selection of the optical sensor cannot be unambiguously verified.

In some embodiments, the processing unit is configured to: calculate a test image frame by subtracting one of two subsequent image frames from the selected optical sensor from another; calculate a standard deviation of pixels of the test image frame; determine one of: that the selected optical sensor operates properly if the calculated standard deviation is above a predefined standard deviation threshold, and that the selected optical sensor does not operate properly if the calculated standard deviation is below the predefined standard deviation threshold.

In some embodiments, the processing unit is further configured to issue a notification that the selected optical sensor does not operate properly.

In some embodiments, the processing unit is configured to: change parameters of the selected optical sensor to the predefined set parameters so as to cause the image frames being acquired by the selected optical sensor to contain a substantially black image; receive, from the selected optical sensor, a first subset of image frames acquired using the predefined set of parameters; change the parameters of the selected optical sensor to a predefined test set of parameters so as to cause the image frames being acquired by the selected optical sensor to contain a test image; receive, from the selected optical sensor, a second subset of image frames acquired using the predefined test set of parameters; calculate an average value of pixels of the image frames of the first subset; calculate an average value and a standard deviation value of pixels of the image frames of the second subset; calculate a signal to noise ratio (SNR) based on the calculated average value of pixels of image frames of the first subset, and based on the calculated average value and the calculated standard deviation value of pixels of images frames of the second subset; and determine one of: that the selected optical sensor operates properly if the calculated SNR is above a predefined SNR threshold; and that the selected optical sensor does not operate properly if the calculated SNR is below the predefined SNR threshold.

In some embodiments, the processing unit is further configured to issue a notification if the selected optical sensor does not operate properly.

Some embodiments of the present invention may provide a method of verifying a selection of an optical sensor of two or more optical sensors, the method may include: receiving a selection of one of a first and second optical sensors to provide a selected optical sensor and a non-selected optical sensor; changing parameters of the selected optical sensor to a selected set of parameters; receiving image frames from the selected optical sensor; changing parameters of the non-selected optical sensor to a predefined set of parameters; receiving image frames from the non-selected optical sensor; determining at least one of: that the selected optical sensor operates according to the selected set of parameters, based on at least a portion of the image frames from the selected optical sensor, and that the non-selected optical sensor operates according to the predefined set of parameters, based on at least a portion of the image frames from the non-selected optical sensor; and verifying, based on at least one of the determinations, the selection of the optical sensor.

Some embodiments may further include changing the parameters of the non-selected optical sensor to the predefined set of parameters so as to cause the image frames being acquired by the non-selected optical sensor to contain a substantially black image.

Some embodiments may further include: calculating an average value of pixels of a subset of the image frames from the non-selected optical sensor; determining that the image frames from the non-selected optical sensor contain the substantially black image and that the non-selected optical sensor operates according to the predefined set of parameters if the calculated average value is below a predefined average threshold value; and verifying, based on the determination, the selection of the optical sensor.

Some embodiments may further include: determining that the image frames from the non-selected optical sensor contain a non-black image and that the non-selected optical sensor does not operate in accordance with the predefined set of parameters if the calculated average is above the predefined average threshold; and issuing a notification, based on the determination, that the selection of the optical sensor cannot be unambiguously verified.

Some embodiments may further include: calculating an average standard deviation value of pixels of a subset of the image frames from the selected optical sensor; and calculating an average standard deviation value of pixels of a subset of the image frames from the non-selected optical sensor; determining that the non-selected optical sensor operates according to the predefined set of parameters if a difference between (i) the average standard deviation value calculated for the image frames from the non-selected optical sensor, and (ii) the average standard deviation value calculated for the image frames from the selected optical sensor is below a predefined first standard deviation threshold; determining that the selected optical sensor operates according to the predefined set of parameters if a difference between (i) the average standard deviation value calculated for the image frames from the selected optical sensor, and (ii) the average standard deviation value calculated for the image frames from the non-selected optical sensor is above a predefined second standard deviation threshold; and verifying, based on the determinations, the selection of the optical.

Some embodiments may further include: determining at least one of: that the non-selected optical sensor does not operate according to the predefined set of parameters if the difference is above the predefined first standard deviation threshold, and that the selected optical sensor does not operate according to the selected set of parameters if the difference is below the predefined second standard deviation threshold; and issuing, based on at least one of the determinations, a notification that the selection of the optical sensor cannot be unambiguously verified.

Some embodiments may further include: calculating a test image frame by subtracting one of two subsequent image frames from the selected optical sensor from another; calculating a standard deviation of pixels of the test image frame; and determining one of: that the selected optical sensor operates properly if the calculated standard deviation is above a predefined standard deviation threshold, and that the selected optical sensor does not operate properly if the calculated standard deviation is below the predefined standard deviation threshold.

Some embodiments may further include issuing a notification that the selected optical sensor does not operate properly.

Some embodiments may further include: changing parameters of the selected optical sensor to the predefined set parameters so as to cause the image frames being acquired by the selected optical sensor to contain a substantially black image; receiving, from the selected optical sensor, a first subset of image frames acquired using the predefined set of parameters; changing the parameters of the selected optical sensor to a predefined test set of parameters so as to cause the image frames being acquired by the selected optical sensor to contain a test image; receiving, from the selected optical sensor, a second subset of image frames acquired using the predefined test set of parameters; calculating an average value of pixels of the image frames of the first subset; calculating an average value and a standard deviation value of pixels of the image frames of the second subset; calculating a signal to noise ratio (SNR) based on the calculated average value of pixels of image frames of the first subset, and based on the calculated average value and the calculated standard deviation value of pixels of images frames of the second subset; and determining one of: that the selected optical sensor operates properly if the calculated SNR is above a predefined SNR threshold; and that the selected optical sensor does not operate properly if the calculated SNR is below the predefined SNR threshold.

Some embodiments may further include issuing a notification if the selected optical sensor does not operate properly.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
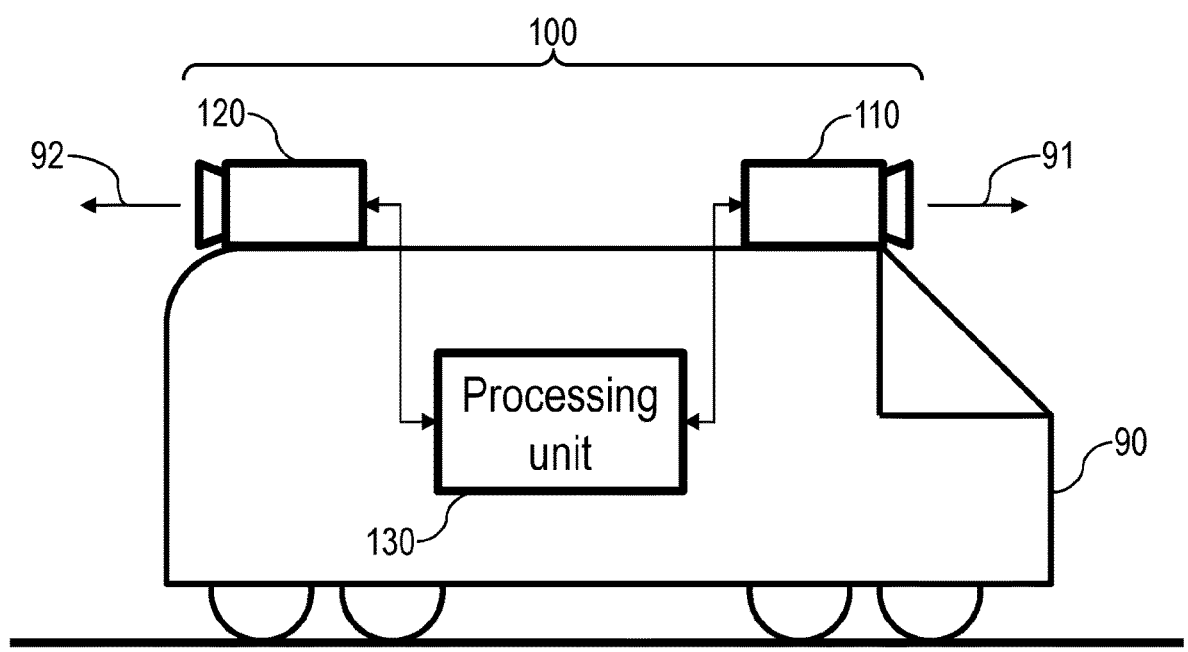
FIG. 1 is a schematic illustration of a system for verifying a selection of an optical sensor of two or more optical sensors, mounted on a train engine, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Reference is now made to FIG. 1, which is a schematic illustration of a system 100 for verifying a selection of an optical sensor of two or more optical sensors, mounted on a train engine 90, according to some embodiments of the invention.

According to some embodiments of the invention, system 100 may include a first optical sensor 110, a second optical sensor 120 and a processing unit 130.

First optical sensor 110 and second sensor 120 may be mounted on, for example, train engine 90. For example, first optical sensor 110 may be mounted on train engine 90 to face a first direction 91, and second optical sensor 120 may be mounted on train engine 90 to face a second direction 92 (e.g., as shown in FIG. 1). First direction 91 and second direction 92 may be opposite (or substantially opposite) to each other. In another example, first optical sensor 110 may be mounted on a front train engine to face first direction 91, and second optical sensor 120 may be mounted on a rear train engine to face second direction 92 (not shown). In another example, first optical sensor 110 may be mounted on the front train engine to face first direction 91, and second optical sensor 120 may be mounted on one of train wagons to face second direction 92 (not shown). Other configurations are also possible. First direction 91 and second direction 92 may be, for example, two possible travel directions of train engine 90. First optical sensor 110 and/or second optical sensor 120 may operate in, for example, visible wavelength range, infrared wavelength range, etc.

Processing unit 130 may receive a selection of one of first optical sensor 110 and second optical sensor 120 to provide a selected optical sensor and a non-selected optical sensor. For example, processing unit 130 may receive the selection from a user, e.g., from a train engine driver.

Upon receipt of the selection of the optical sensor, processing unit 130 may change parameters of the selected optical sensor to a selected set of parameters. For example, the selected set of parameters may cause the selected optical sensor to operate in an automatic mode in which the selected optical sensor may automatically determine its parameters, e.g., within constrains defined by the selected set of parameters. In another example, the parameters of the selected set may be predefined (e.g., based on the application of system 100). Processing unit 130 may receive image frames from the selected optical sensor. The image frames being received from the selected optical sensor may include, for example, images of a landscape, rails, obstacles on or in a vicinity of rails, etc. Processing unit 130 may process the image frames being received from the selected optical sensor to, for example, detect rails, detect obstacles on and/or in a vicinity of the rails, determine whether or not the obstacles form a threat on train engine 90 travel, generate an alarm and/or cause train engine 90 to stop if the obstacles form a threat on train engine 90 travel, etc.

Upon receipt of the selection of the optical sensor, processing unit 130 may control the non-selected optical sensor to operate in a manual mode. Processing unit 130 may change parameters of the non-selected optical sensor to a predefined set of parameters. In some embodiments, the predefined set of parameters may cause the non-selected optical sensor to acquire image frames containing a black (or substantially black) image. For example, if the non-selected optical sensor operates in a visible wavelength range, the predefined set of parameters for the non-selected optical sensor may include at least one of: a minimal exposure time, a minimal ISO, a minimal Gain, and/or a maximal f-number of a lens of the optical sensor (for lens capable of changing its f-number). Black (or substantially black) image may be obtained by, for example, modifying (e.g., either analogically or digitally) the values of the image frames from the non-selected optical sensor to a low gray value level and/or a white image may be obtained by modifying (e.g., either analogically or digitally) the values of the image frames from the non-selected optical sensor to a high gray value level.

For safety reasons, upon receipt of the selection of the optical sensor, processing unit 130 has to verify the selection of the optical sensor. Processing unit 130 may receive image frames from the non-selected optical sensor and receive image frames from the selected optical sensors. In some embodiments, processing unit 130 may determine, based on at least a portion of the image frames from the non-selected optical sensor, that the non-selected optical sensor operates according to the predefined set of parameters. In some embodiments, processing unit 130 may determine, based on at least a portion of the image frames from the selected optical sensor, that the selected optical sensor operates according to the selected set of parameters. Processing unit 130 may verify, based on at least one of the determinations thereof, the selection of the optical sensor.

According to some embodiments, processing unit 130 may calculate an average value of pixels of a subset of image frames from the non-selected optical sensor.

The calculated average value that is below a predefined average threshold may indicate that the image frames from the non-selected optical sensor indeed contain the black (or substantially black) image and thus the non-selected optical sensor operates according to the predefined set of parameters. Processing unit 130 may thus determine that the image frames from the non-selected optical sensor contain the black (or substantially black) image and that the non-selected optical sensor operates according to the predefined set of parameters if the calculated average value is below the predefined average threshold. Processing unit 130 may verify the selection of the optical sensor based on the determination thereof.

The calculated average value that is above the predefined average threshold may indicate that the image frames from the non-selected optical sensor contain a non-black image (e.g., a non-black image in which landscape, rails and/or obstacles may be detected) and thus that the non-selected optical sensor does not operate according to the predefined set of parameters. In this case, the selection of the optical sensor cannot be unambiguously verified. This may be unsafe, since, if both selected and non-selected optical sensors acquire image frames that contain non-black images in which landscapes, rails and/or obstacles may be detected, it may be difficult or impossible to unambiguously determine whether the detected landscape, rails and/or obstacles are in first direction 91 or in second direction 92 with respect to train engine 90. Processing unit 130 may thus determine that the image frames from the non-selected optical sensor contain a non-black image and that the non-selected optical sensor does not operate according to the predefined set of parameters if the calculated average value is above the predefined average threshold. In some embodiments, processing unit 130 may issue a notification that the selection of the optical sensor cannot be unambiguously verified.

According to some embodiments, processing unit 130 may calculate: (i) an average standard deviation value of pixels of a subset of the image frames from the non-selected optical sensor; and (ii) an average standard deviation value of pixels of a subset of the image frames from the selected optical sensor.

In some embodiments, processing unit 130 may determine that the non-selected optical sensor operates according to the predefined set of parameters if a difference between (i) the average standard deviation value calculated for the image frames from the non-selected optical sensor, and (ii) the average standard deviation value calculated for the image frames from the selected optical sensor is below a predefined first standard deviation threshold. In some embodiments, processing unit 130 may determine that the selected optical sensor operates according to the selected set of parameters if a difference between (i) the average standard deviation value calculated for the image frames from the selected optical sensor, and (ii) the average standard deviation value calculated for the image frames from the non-selected optical sensor is above a predefined second standard deviation threshold. Processing unit 130 may verify the selection of the optical sensor based on the determination that the selected optical sensor operates according to the selected set of parameters and based on the determination that the non-selected optical sensor operates according to the predefined set of parameters.

In some embodiments, processing unit 130 may determine that the non-selected optical sensor does not operate according to the predefined set of parameters if the difference is above the predefined first standard deviation threshold. In some embodiments, processing unit 130 may determine that the selected optical sensor does not operate according to the selected set of parameters if the difference is below the predefined second standard deviation threshold. In some embodiments, processing unit 130 may issue a notification that the selection of the optical sensor cannot be unambiguously verified if the selected optical sensor does not operate according to the selected set of parameters and/or if the non-selected optical sensor does not operate according to the predefined set of parameters.

According to some embodiments of the invention, processing unit 130 may perform a continuous built-in-test (BIT) of the selected optical sensor.

Processing unit 130 may receive image frames from the selected optical sensor. Processing unit 130 may calculate a test image frame based on two subsequent image frames from the selected optical sensor. In some embodiments, the test image frame may be calculated by subtracting one of the two subsequent image frames from the selected optical sensor from another. Processing unit 130 may calculate a standard deviation of the test image frame. Processing unit 130 may determine, based on the calculated standard deviation of the test image, whether or not the selected optical sensor operates properly.

For example, the calculated standard deviation of the test image frame that is above a predefined BIT standard deviation threshold may indicate that the subsequent image frames from the selected optical sensor contain different measures of random noise, which may indicate that the selected optical sensor operates properly. For example, this may indicate that the selected optical sensor is not frozen. Processing unit 130 may thus determine that the selected optical sensor operates properly if the calculated standard deviation is above the predefined BIT standard deviation threshold.

The calculated standard deviation of the test image frame that is below the predefined BIT standard deviation threshold may, for example, indicate that the subsequent image frames from the selected optical sensor contain substantially the same image, which may indicate that the selected optical sensor does not operate properly. For example, this may indicate that the selected optical sensor is frozen. Processing unit 130 may thus determine that the selected optical sensor does not operate properly if the calculated standard deviation is below the predefined BIT standard deviation threshold. In some embodiments, processing unit 130 may issue a notification that the selected optical sensor does not operate properly.

In some embodiments, processing unit 130 may continuously perform the BIT of the selected optical sensor. For example, processing unit 130 may perform the BIT based on each two subsequent image frames from the selected optical sensor.

It is noted that other methods of continuous BIT may be applied. Such methods may, for example, include cyclic redundancy check (CRC), etc.

According to some embodiments of the invention, processing unit 130 may perform a periodic built-in-test (BIT) of the selected optical sensor.

Processing unit 130 may perform the periodic BIT of the selected optical sensor at predefined time intervals. For example, processing unit 130 may perform the periodic BIT at a frequency of at least few minutes, tens of minutes or when the train engine is stationary (e.g., at a station, etc.).

Processing unit 130 may change parameters of the selected optical sensor to the predefined set parameters. Processing unit 130 may receive, from the selected optical sensor, a first subset of image frames acquired using the predefined set of parameters. Processing unit 130 may change the parameters of the selected optical sensor to a predefined test set of parameters. Processing unit 130 may receive, from the selected optical sensor, a second subset of image frame acquired using the predefined test set of parameters. Processing unit 130 may determine, based on the first subset of image frames and the second subset image frames, whether or not the selected optical sensor operates properly.

For example, processing unit 130 may change parameters of the selected optical sensor to the predefined test set of parameters so as to cause the image frames of the first subset to contain a black (or substantially black) image.

Yet, in this example, processing unit 130 may change parameters of the selected optical sensor to the predefined test set of parameters so as to cause the image frames of the second subset to contain a test image (e.g., a non-black image). For example, if the selected optical sensor operates in a visible wavelength range, the predefined test set of parameters may include at least one of: a predefined exposure time (e.g., 1/FPS, wherein FPS is a frames per second rate of the selected optical sensor), a maximal ISO, a maximal Gain, and a minimal f-number of lens of the selected optical sensor (e.g., as described hereinabove).

Yet, in this example, processing unit 130 may calculate an average value of pixels of image frames of the first subset. Yet, in this example, processing unit 130 may calculate an average value and a standard deviation value of pixels of images frames of the second subset.

Yet, in this example, processing unit 130 may calculate a signal to noise ratio (SNR) based on the calculated average value of pixels of image frames of the first subset, and based on the calculated average value and the calculated standard deviation value of pixels of images frames of the second subset.

For example, the SNR may be determined based on the average value of pixels of image frames of the first subset ($\mu_1$), and based on the average value ($\mu_2$) and the standard deviation value ($\sigma_2$) of pixels of images frames of the second subset as follows:

$$\text{SNR}=(\mu_2-\mu_1)/\sigma_2 \quad \text{(Equation 1)}$$

The calculated SNR that is above a predefined SNR threshold may indicate that the selected optical sensor is capable of changing its parameters (e.g., either automatically or in accordance with instructions from processing unit 130), that the selected optical sensor is capable of operating in dynamically changing conditions (e.g., environmental conditions), that the communication channel between the selected optical sensor and processing unit 130 is in order, etc. Processing unit 130 may thus determine that the selected optical sensor operates properly if the calculated SNR is above the predefined SNR threshold.

Yet, in this example, processing unit 130 determine that the selected optical sensor does not operate properly if the calculated SNR is below the predefined SNR threshold. In some embodiments, processing unit 130 may issue a notification that the selected optical sensor does not operate properly.

Upon completing the periodic BIT, processing unit 130 may control the selected optical sensor to operate in the automatic mode.

It is noted that, although FIG. 1 shows first and second optical sensors 110, 120 mounted on train engine 90 and facing opposite directions with respect to each other, first and second optical sensors 110, 120 may be mounted on any vehicle and each of first and second optical sensors 110, 120 may face any direction with respect to each other. It is also noted that system 100 may include more than two optical sensors.

Figure 2:
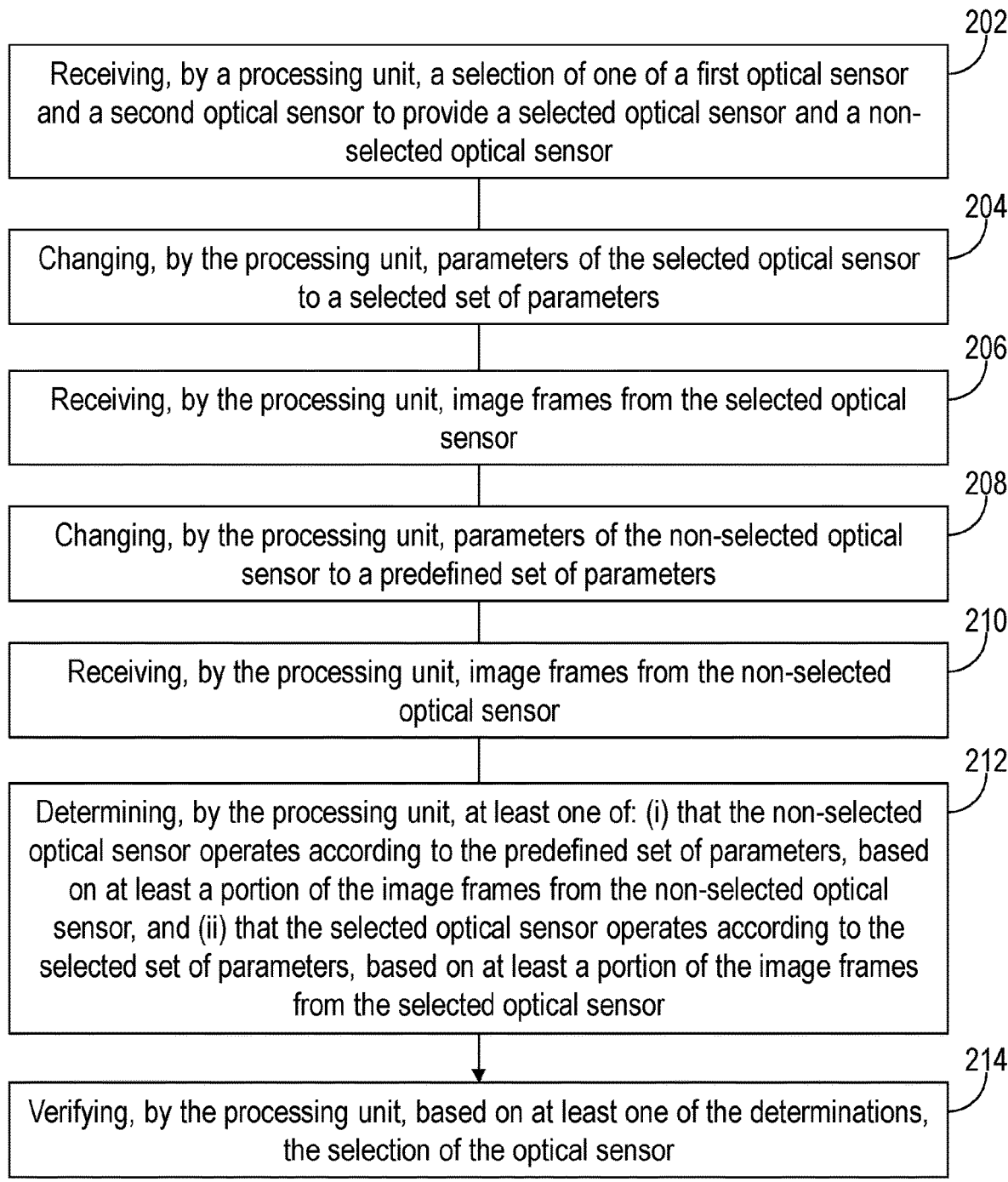
FIG. 2 which is flowchart of a method of verifying a selection of an optical sensor of two or more optical sensors, according to some embodiments of the invention.

Reference is now made to FIG. 2, which is flowchart of a method of verifying a selection of an optical sensor of two or more optical sensors, according to some embodiments of the invention.

The method may be implemented by system 100 that may be configured to implement the method.

The method may include receiving 202, by a processing unit, a selection of one of a first optical sensor and a second optical sensor to provide a selected optical sensor and a non-selected optical sensor. For example, first optical sensor 110, second optical sensor 120 and processing unit 130 described above with respect to FIG. 1. The selection of the optical sensors may be received from, for example, a user, e.g., from a train engine driver.

The method may include changing 204, by the processing unit, parameters of the selected optical sensor to a selected set of parameters (e.g., as described above with respect to FIG. 1). For example, the selected set of parameters may cause the selected optical sensor to operate in an automatic mode in which the selected optical sensor may automatically determine its parameters, e.g., within constrains defined by the selected set of parameters. In another example, the parameters of the selected set may be predefined.

The method may include receiving 206, by the processing unit, image frames from the selected optical sensor.

The method may include changing 208, by the processing unit, parameters of the non-selected optical sensor to a predefined set of parameters (e.g., as described above with respect to FIG. 1). For example, some embodiments may include controlling, by the processing unit, the non-selected optical sensor to operate in a manual mode upon receipt of the selection of the optical sensor and changing the parameters of the non-selected optical sensor to the predefined set of parameters.

The method may include receiving 210, by the processing unit, image frames from the non-selected optical sensor.

For safety reasons, upon receipt of the selection of the optical sensor, the processing unit has to verify the selection of the optical sensor.

The method may include determining 212, by the processing unit, at least one of: (i) that the non-selected optical sensor operates according to the predefined set of parameters, based on at least a portion of the image frames from the non-selected optical sensor, and (ii) that the selected optical sensor operates according to the selected set of parameters, based on at least a portion of the image frames from the selected optical sensor.

The method may include verifying 214, by the processing unit, based on at least one of the determinations, the selection of the optical sensor.

Some embodiments may include changing, by the processing unit, the parameters of the non-selected optical sensor so as to cause the image frames being acquired by the non-selected optical sensor to contain a black (or substantially black) image (e.g., as described above with respect to FIG. 1).

Some embodiments may include calculating, by the processing unit, an average value of pixels of a subset of image frames from the non-selected optical sensor.

Some embodiments may include determining, by the processing unit, that the image frames from the non-selected optical sensor contain the black (or substantially black) image and that the non-selected optical sensor operates according to the predefined set of parameters if the calculated average value is below the predefined average threshold. Some embodiments may include verifying, by the processing unit, the selection of the optical sensor based on the determination thereof (e.g., as described above with respect to FIG. 1).

Some embodiments may include determining, by the processing unit, that the image frames from the non-selected optical sensor contain a non-black image and that the non-selected optical sensor does not operate according to the predefined set of parameters if the calculated average value is above the predefined average threshold (e.g., as described above with respect to FIG. 1). Some embodiments may include issuing, by the processing unit, a notification that the selection of the optical sensor cannot be unambiguously verified.

Some embodiments may include calculating: (i) an average standard deviation value of pixels of a subset of the image frames from the non-selected optical sensor; and (ii) an average standard deviation value of pixels of a subset of the image frames from the selected optical sensor.

Some embodiments may include determining that the non-selected optical sensor operates according to the predefined set of parameters if a difference between (i) the average standard deviation value calculated for the image frames from the non-selected optical sensor, and (ii) the average standard deviation value calculated for the image frames from the selected optical sensor is below a predefined first standard deviation threshold. Some embodiments may include determining that the selected optical sensor operates according to the selected set of parameters if a difference between (i) the average standard deviation value calculated for the image frames from the selected optical sensor, and (ii) the average standard deviation value calculated for the image frames from the non-selected optical sensor is above a second predefined standard deviation threshold. Some embodiments may include verifying the selection of the optical sensor based on the determination that the selected optical sensor operates according to the selected set of parameters and based on the determination that the non-selected optical sensor operates according to the predefined set of parameters.

Some embodiments may include determining that the non-selected optical sensor does not operate according to the predefined set of parameters if the difference is above the predefined first standard deviation threshold. Some embodiments may include determining that the selected optical sensor does not operate according to the selected set of parameters if the difference is below the predefined second standard deviation threshold. Some embodiments may include issuing a notification that the selection of the optical sensor cannot be unambiguously verified if the selected optical sensor does not operate according to the selected set of parameters and/or if the non-selected optical sensor does not operate according to the predefined set of parameters.

Some embodiments may include, upon receipt of the selection of the optical sensor, controlling, by the processing unit, the selected optical sensor to operate in an automatic mode. Some embodiments may include receiving, by the processing unit, image frames from the selected optical sensor. Some embodiments may include processing, by the processing unit, the image frames from the selected optical sensor to, for example, detect rails, detect obstacles on and/or in a vicinity of the rails, determine whether or not the obstacles form a threat on the train engine travel, generate an alarm and/or cause the train engine to stop if the obstacles form a threat on the train engine travel, etc.

Some embodiments may include performing, by the processing unit, a continuous built-in-test (BIT) of the selected optical sensor. Some embodiments may include receiving, by the processing unit, image frames from the selected optical sensor. Some embodiments may include calculating, by the processing unit, a test image frame based on two subsequent image frames from the selected optical sensor. Some embodiments may include calculating, by the processing unit, the test image frame by subtracting one of the two subsequent image frames from the selected optical sensor from another. Some embodiments may include calculating, by the processing unit, a parameter of the test image frame. In some embodiments, the calculated parameter may be a standard deviation of the test image frame. Some embodiments may include determining, by the processing unit, based on the calculated parameter of the test image, whether or not the selected optical sensor operates properly.

For example, the calculated standard deviation of the test image frame that is above a predefined BIT standard deviation threshold may indicate that the subsequent image frames from the selected optical sensor contain different measures of random noise, which may indicate that the selected optical sensor operates properly. For example, this may indicate that the selected optical sensor is not frozen. Some embodiments may include determining, by the processing unit, that the selected optical sensor operates properly if the calculated standard deviation is above the predefined BIT standard deviation threshold.

The calculated standard deviation of the test image frame that is below the predefined BIT standard deviation threshold may, for example, indicate that the subsequent image frames from the selected optical sensor contain substantially the same image, which may indicate that the selected optical sensor does not operate properly. For example, this may indicate that the selected optical sensor is frozen. Some embodiments may include determining, by the processing unit, that the selected optical sensor does not operate properly if the calculated standard deviation is below the predefined BIT standard deviation threshold. Some embodiments may include issuing, by the processing unit, a notification that the selected optical sensor does not operate properly.

Some embodiments may include continuously performing, by the processing unit, the BIT of the selected optical sensor. For example, some embodiments may include performing the BIT based on each two subsequent image frames from the selected optical sensor.

Some embodiments may include performing, by the processing unit, a periodic built-in-test (BIT) of the selected optical sensor. Some embodiments may include performing the periodic BIT of the selected optical sensor at a frequency of at least few minutes, tens of minutes or when the train engine is stationary (e.g., at a station, etc.).

Some embodiments may include changing, by the processing unit, parameters of the selected optical sensor to the predefined set parameters. Some embodiments may include receiving, by the processing unit, from the selected optical sensor, a first subset of image frames acquired using the predefined set of parameters. Some embodiments may include changing, by the processing unit, the parameters of the selected optical sensor to predefined test set of parameters. Some embodiments may include receiving, by the processing unit, from the selected optical sensor, a second subset of image frame acquired using the predefined test set of parameters. Some embodiments may include determining, by the processing unit, based on the first subset of image frames and the second subset image frames, whether or not the selected optical sensor operates properly.

Some embodiments may include changing, by the processing unit, the parameters of the selected optical sensor to the predefined set of parameters so as to cause the image frames of the first subset to contain a black (or substantially black) image (e.g., as described above with respect to FIG. 1).

Some embodiments may include changing, by the processing unit, the parameters of the selected optical sensor to the predefined test set of parameters so as to cause the image frames of the second subset to contain a test image (e.g., a non-black image). The predefined test set of parameters may, for example, include at least one of: a predefined exposure time (e.g., 1/FPS), a maximal ISO, a maximal Gain and a minimal f-number.

Some embodiments may include calculating, by the processing unit, an average value of pixels of image frames of the first subset. Some embodiments may include calculating, by the processing unit, an average value and a standard deviation value of pixels of images frames of the second subset.

Some embodiments may include calculating, by the processing unit, a signal to noise ratio (SNR) based on the calculated average value of pixels of image frames of the first subset, and based on the calculated average value and the calculated standard deviation value of pixels of images frames of the second subset.

The calculated SNR that is above a predefined SNR threshold may indicate that the selected optical sensor is capable of changing its parameters (e.g., either automatically or in accordance with instructions from the processing unit), that the selected optical sensor is capable of operating in dynamically changing conditions (e.g., environmental conditions), that the communication channel between the selected optical sensor and the processing unit is in order, etc. Some embodiments may include determining, by the processing unit, that the selected optical sensor operates properly if the calculated SNR is above the predefined SNR threshold.

Some embodiments may include determining, by the processing unit, that the selected optical sensor does not operate properly if the calculated SNR is below the predefined SNR threshold. Some embodiments may include issuing, by the processing unit, a notification that the selected optical sensor does not operate properly.

Some embodiments may include, upon completing the periodic BIT, controlling, by the processing unit, the selected optical sensor to operate in the automatic mode.

Figure 3:
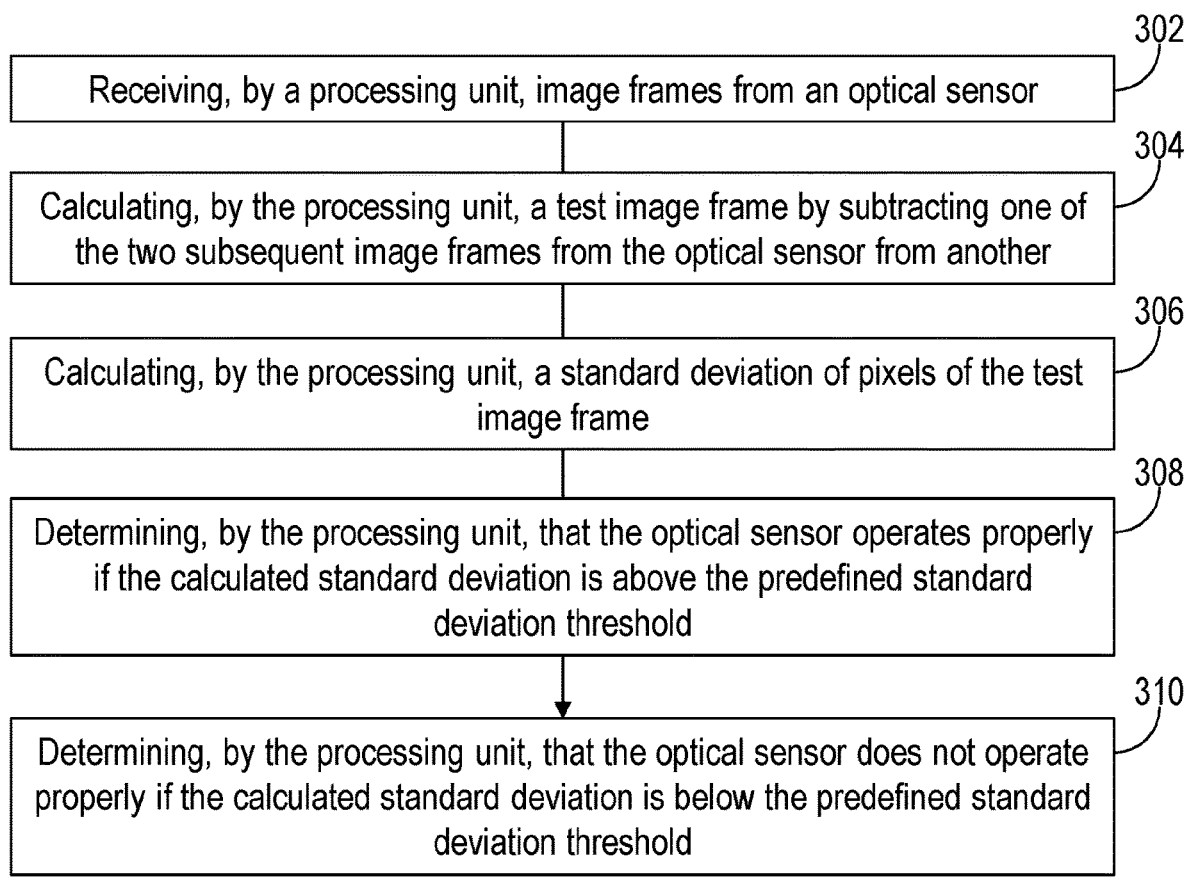
FIG. 3 is a flowchart of a method of performing a continuous built-in test (BIT) of an optical sensor, according to some embodiments of the invention.

Reference is now made to FIG. 3, which is a flowchart of a method of performing a continuous built-in test (BIT) of an optical sensor, according to some embodiments of the invention.

The method may include receiving 302, by a processing unit, image frames from an optical sensor (e.g., as described above with respect to FIGS. 1 and 2). The method may include calculating 304, by the processing unit, a test image frame by subtracting one of the two subsequent image frames from the optical sensor from another (e.g., as described above with respect to FIGS. 1 and 2). The method may include calculating 306, by the processing unit, a standard deviation of pixels of the test image frame (e.g., as described above with respect to FIGS. 1 and 2). The method may include determining 308, by the processing unit, that the optical sensor operates properly if the calculated standard deviation is above a predefined BIT standard deviation threshold (e.g., as described above with respect to FIGS. 1 and 2). The method may include determining 310, by the processing unit, that the optical sensor does not operate properly if the calculated standard deviation is below the predefined BIT standard deviation threshold (e.g., as described above with respect to FIGS. 1 and 2).

Some embodiments may include calculating, by the processing unit, the test image based on each two subsequent image frames from the optical sensor (e.g., as described above with respect to FIGS. 1 and 2).

Some embodiments may include issuing, by the processing unit, a notification that the optical sensor does not operate properly (e.g., as described above with respect to FIGS. 1 and 2).

Figure 4:
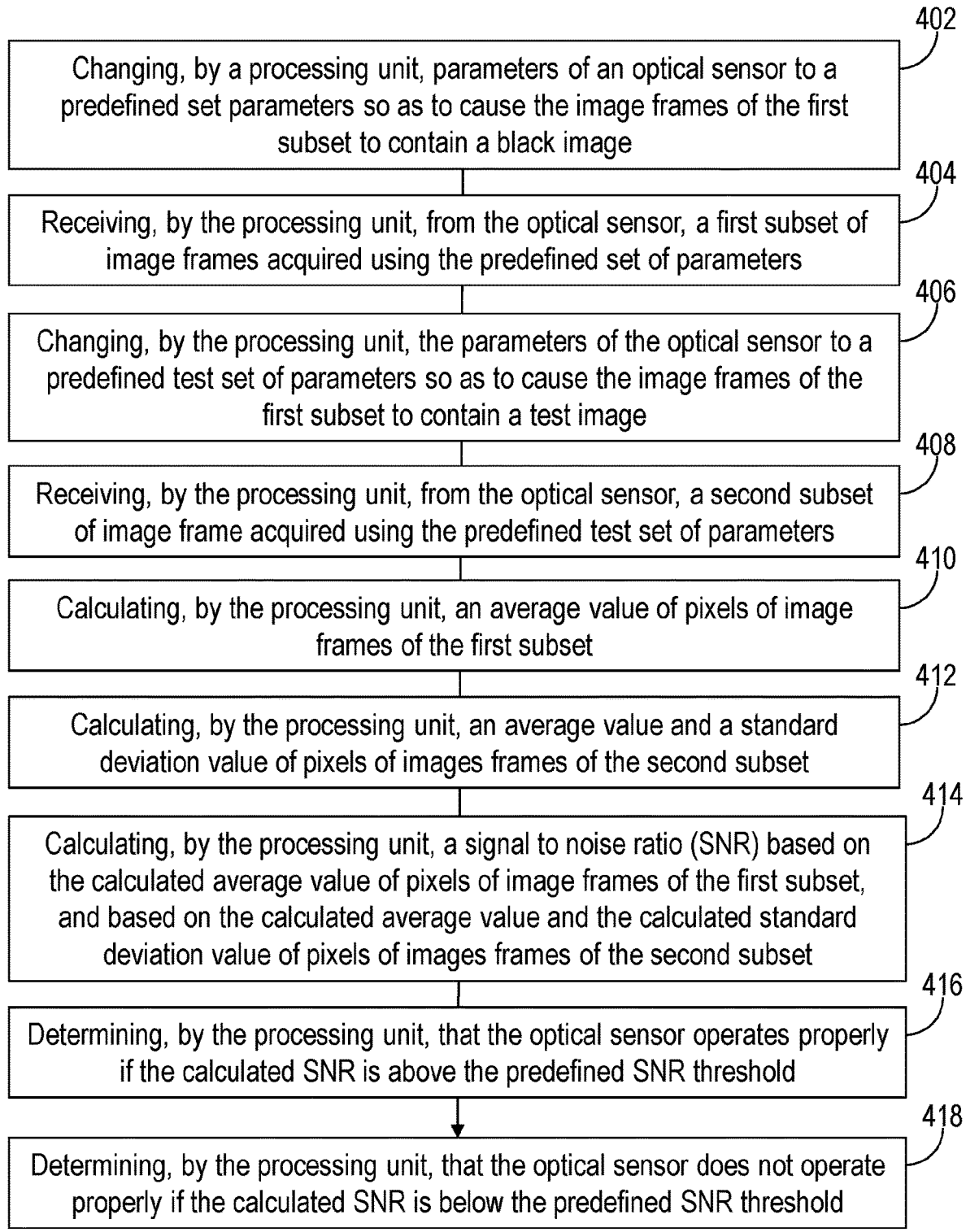
FIG. 4 is a flowchart of a method of performing a periodic built-in test (BIT) of an optical sensor, according to some embodiments of the invention.

Reference is now made to FIG. 4, which is a flowchart of a method of performing a periodic built-in test (BIT) of an optical sensor, according to some embodiments of the invention.

The method may include changing 402, by a processing unit, parameters of an optical sensor to a predefined set parameters so as to cause the image frames of the first subset to contain a black (or substantially black) image (e.g., as described above with respect to FIGS. 1 and 2). The method may include receiving 404, by the processing unit, from the optical sensor, a first subset of image frames acquired using the predefined set of parameters.

The method may include changing 406, by the processing unit, the parameters of the optical sensor to a predefined test set of parameters so as to cause the image frames of the first subset to contain a test image (e.g., non-black and non-saturated image). For example, as described above with respect to FIGS. 1 and 2. The method may include receiving 408, by the processing unit, from the optical sensor, a second subset of image frame acquired using the predefined test set of parameters.

The method may include calculating 410, by the processing unit, an average value of pixels of image frames of the first subset. The method may include calculating 412, by the processing unit, an average value and a standard deviation value of pixels of images frames of the second subset. The method may include calculating 414, by the processing unit, a signal to noise ratio (SNR) based on the calculated average value of pixels of image frames of the first subset, and based on the calculated average value and the calculated standard deviation value of pixels of images frames of the second subset.

The method may include determining 416, by the processing unit, that the optical sensor operates properly if the calculated SNR is above the predefined SNR threshold. The method may include determining 418, by the processing unit, that the optical sensor does not operate properly if the calculated SNR is below the predefined SNR threshold. Some embodiments may include issuing, by the processing unit, a notification that the selected optical sensor does not operate properly.

Some embodiments may include performing the periodic BIT of the selected optical sensor at predefined time intervals. For example, the periodic BIT may be performed at a frequency of at least few minutes, tens of minutes or when the train engine is stationary (e.g., at a station, etc.).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for verifying a selection of an optical sensor of two or more optical sensors, the system comprising:
   a first optical sensor;
   a second optical sensor; and
   a processing unit coupled to the first and second optical sensors, the processing unit being configured to:
      receive a selection of one of the first and second optical sensors to provide a selected optical sensor and a non-selected optical sensor;
      change parameters of the selected optical sensor to a selected set of parameters;
      receive image frames from the selected optical sensor;
      change parameters of the non-selected optical sensor to a predefined set of parameters;
      receive image frames from the non-selected optical sensor;
      determine at least one of:
         that the selected optical sensor operates according to the selected set of parameters, based on at least a portion of the image frames from the selected optical sensor, and that the non-selected optical sensor operates according to the predefined set of parameters, based on at least a portion of the image frames from the non-selected optical sensor; and
verify, based on at least one of the determinations, the selection of the optical sensor.

2. The system of claim 1, wherein the processing unit is configured to change the parameters of the non-selected optical sensor to the predefined set of parameters so as to cause the image frames being acquired by the non-selected optical sensor to contain a substantially black image.

3. The system of claim 2, wherein the processing unit is further configured to:
calculate an average value of pixels of a subset of the image frames from the non-selected optical sensor;
determine that the image frames from the non-selected optical sensor contain the substantially black image and that the non-selected optical sensor operates according to the predefined set of parameters if the calculated average value is below a predefined average threshold value; and
verify, based on the determination, the selection of the optical sensor.

4. The system of claim 3, wherein the processing unit is further configured to:
determine that the image frames from the non-selected optical sensor contain a non-black image and that the non-selected optical sensor does not operate in accordance with the predefined set of parameters if the calculated average is above the predefined average threshold; and
issue a notification, based on the determination, that the selection of the optical sensor cannot be unambiguously verified.

5. The system of claim 1, wherein the processing unit is configured to:
calculate an average standard deviation value of pixels of a subset of the image frames from the selected optical sensor;
calculate an average standard deviation value of pixels of a subset of the image frames from the non-selected optical sensor;
determine that the non-selected optical sensor operates according to the predefined set of parameters if a difference between (i) the average standard deviation value calculated for the image frames from the non-selected optical sensor, and (ii) the average standard deviation value calculated for the image frames from the selected optical sensor is below a predefined first standard deviation threshold;
determine that the selected optical sensor operates according to the predefined set of parameters if a difference between (i) the average standard deviation value calculated for the image frames from the selected optical sensor, and (ii) the average standard deviation value calculated for the image frames from the non-selected optical sensor is above a predefined second standard deviation threshold; and
verify, based on the determinations, the selection of the optical sensor.

6. The system of claim 5, wherein the processing unit is configured to:
determine at least one of:
that the non-selected optical sensor does not operate according to the predefined set of parameters if the difference is above the predefined first standard deviation threshold, and
determine that the selected optical sensor does not operate according to the selected set of parameters if the difference is below the predefined second standard deviation threshold; and
issue, based on at least one of the determinations, a notification that the selection of the optical sensor cannot be unambiguously verified.

7. The system of claim 1, wherein the processing unit is configured to:
calculate a test image frame by subtracting one of two subsequent image frames from the selected optical sensor from another;
calculate a standard deviation of pixels of the test image frame;
determine one of:
that the selected optical sensor operates properly if the calculated standard deviation is above a predefined standard deviation threshold, and
that the selected optical sensor does not operate properly if the calculated standard deviation is below the predefined standard deviation threshold.

8. The system of claim 7, wherein the processing unit is further configured to issue a notification that the selected optical sensor does not operate properly.

9. The system of claim 1, wherein the processing unit is configured to:
change parameters of the selected optical sensor to the predefined set parameters so as to cause the image frames being acquired by the selected optical sensor to contain a substantially black image;
receive, from the selected optical sensor, a first subset of image frames acquired using the predefined set of parameters;
change the parameters of the selected optical sensor to a predefined test set of parameters so as to cause the image frames being acquired by the selected optical sensor to contain a test image;
receive, from the selected optical sensor, a second subset of image frames acquired using the predefined test set of parameters;
calculate an average value of pixels of the image frames of the first subset;
calculate an average value and a standard deviation value of pixels of the image frames of the second subset;
calculate a signal to noise ratio (SNR) based on the calculated average value of pixels of image frames of the first subset, and based on the calculated average value and the calculated standard deviation value of pixels of images frames of the second subset; and
determine one of:
that the selected optical sensor operates properly if the calculated SNR is above a predefined SNR threshold; and
that the selected optical sensor does not operate properly if the calculated SNR is below the predefined SNR threshold.

10. The system of claim 9, wherein the processing unit is further configured to issue a notification if the selected optical sensor does not operate properly.

11. A method of verifying a selection of an optical sensor of two or more optical sensors, the method comprising:
receiving a selection of one of a first and second optical sensors to provide a selected optical sensor and a non-selected optical sensor;
changing parameters of the selected optical sensor to a selected set of parameters;
receiving image frames from the selected optical sensor;

changing parameters of the non-selected optical sensor to a predefined set of parameters;
receiving image frames from the non-selected optical sensor;
determining at least one of:
that the selected optical sensor operates according to the selected set of parameters, based on at least a portion of the image frames from the selected optical sensor, and
that the non-selected optical sensor operates according to the predefined set of parameters, based on at least a portion of the image frames from the non-selected optical sensor; and
verifying, based on at least one of the determinations, the selection of the optical sensor.

12. The method of claim 11, further comprising changing the parameters of the non-selected optical sensor to the predefined set of parameters so as to cause the image frames being acquired by the non-selected optical sensor to contain a substantially black image.

13. The method of claim 12, further comprising:
calculating an average value of pixels of a subset of the image frames from the non-selected optical sensor;
determining that the image frames from the non-selected optical sensor contain the substantially black image and that the non-selected optical sensor operates according to the predefined set of parameters if the calculated average value is below a predefined average threshold value; and
verifying, based on the determination, the selection of the optical sensor.

14. The method of claim 13, further comprising:
determining that the image frames from the non-selected optical sensor contain a non-black image and that the non-selected optical sensor does not operate in accordance with the predefined set of parameters if the calculated average is above the predefined average threshold; and
issuing a notification, based on the determination, that the selection of the optical sensor cannot be unambiguously verified.

15. The method of claim 11, further comprising:
calculating an average standard deviation value of pixels of a subset of the image frames from the selected optical sensor; and
calculating an average standard deviation value of pixels of a subset of the image frames from the non-selected optical sensor;
determining that the non-selected optical sensor operates according to the predefined set of parameters if a difference between (i) the average standard deviation value calculated for the image frames from the non-selected optical sensor, and (ii) the average standard deviation value calculated for the image frames from the selected optical sensor is below a predefined first standard deviation threshold;
determining that the selected optical sensor operates according to the predefined set of parameters if a difference between (i) the average standard deviation value calculated for the image frames from the selected optical sensor, and (ii) the average standard deviation value calculated for the image frames from the non-selected optical sensor is above a predefined second standard deviation threshold; and
verifying, based on the determinations, the selection of the optical.

16. The method of claim 15, further comprising:
determining at least one of:
that the non-selected optical sensor does not operate according to the predefined set of parameters if the difference is above the predefined first standard deviation threshold, and
that the selected optical sensor does not operate according to the selected set of parameters if the difference is below the predefined second standard deviation threshold; and
issuing, based on at least one of the determinations, a notification that the selection of the optical sensor cannot be unambiguously verified.

17. The method of claim 11, further comprising:
calculating a test image frame by subtracting one of two subsequent image frames from the selected optical sensor from another;
calculating a standard deviation of pixels of the test image frame; and
determining one of:
that the selected optical sensor operates properly if the calculated standard deviation is above a predefined standard deviation threshold, and
that the selected optical sensor does not operate properly if the calculated standard deviation is below the predefined standard deviation threshold.

18. The method of claim 17, further comprising issuing a notification that the selected optical sensor does not operate properly.

19. The method of claim 11, further comprising:
changing parameters of the selected optical sensor to the predefined set parameters so as to cause the image frames being acquired by the selected optical sensor to contain a substantially black image;
receiving, from the selected optical sensor, a first subset of image frames acquired using the predefined set of parameters;
changing the parameters of the selected optical sensor to a predefined test set of parameters so as to cause the image frames being acquired by the selected optical sensor to contain a test image;
receiving, from the selected optical sensor, a second subset of image frames acquired using the predefined test set of parameters;
calculating an average value of pixels of the image frames of the first subset;
calculating an average value and a standard deviation value of pixels of the image frames of the second subset;
calculating a signal to noise ratio (SNR) based on the calculated average value of pixels of image frames of the first subset, and based on the calculated average value and the calculated standard deviation value of pixels of images frames of the second subset; and
determining one of:
that the selected optical sensor operates properly if the calculated SNR is above a predefined SNR threshold; and
that the selected optical sensor does not operate properly if the calculated SNR is below the predefined SNR threshold.

20. The method of claim 19, further comprising issuing a notification if the selected optical sensor does not operate properly.

* * * * *